United States Patent [19]

Schierling

[11] Patent Number: 5,526,714

[45] Date of Patent: Jun. 18, 1996

[54] TORSIONAL VIBRATION DAMPER FOR THE DRIVE LINE OF A MOTOR VEHICLE

[75] Inventor: Bernhard Schierling, Kürnach, Germany

[73] Assignee: Fichtel & Sachs AG, Schweinfurt, Germany

[21] Appl. No.: 109,368

[22] Filed: Aug. 19, 1993

[30] Foreign Application Priority Data

Aug. 20, 1992 [DE] Germany .......................... 42 27 534.2
Aug. 12, 1993 [DE] Germany .......................... 43 27 017.4

[51] Int. Cl.$^6$ .................................................. F16F 15/10
[52] U.S. Cl. ........................ 74/574; 192/107 M; 192/212
[58] Field of Search ........................ 74/574; 192/106.2, 192/70.17, 70.18, 106.1, 107 M; 464/65, 68

[56] References Cited

U.S. PATENT DOCUMENTS

| | | | |
|---|---|---|---|
| 3,485,331 | 12/1969 | Volker et al. | 192/107 M |
| 4,856,636 | 8/1989 | Meinhard | 74/574 |
| 4,887,485 | 12/1989 | Kobayashi et al. | 74/574 |
| 5,213,188 | 5/1993 | Feser et al. | 192/106.2 |

FOREIGN PATENT DOCUMENTS 2323872  12/1983  Germany .
2025152  1/1980  United Kingdom .
2240142  7/1991  United Kingdom .............. 192/107 M
14076    8/1992  WIPO .

Primary Examiner—Rodney H. Bonck
Assistant Examiner—May Ann Battista
Attorney, Agent, or Firm—Brumbaugh, Graves, Donohue & Raymond

[57] ABSTRACT

A torsional vibration damper for the drive line of a motor vehicle includes an input damper part rotatable about an axis of rotation, an output damper part rotatable about the axis of rotation relative to the input damper part over a limited relative angle of rotation, a spring system coupling the two damper parts together in a rotationally elastic manner, and a friction ring axially clamped between friction surfaces of the damper parts by an axial spring force. The friction ring has a carrier of substantially annular disk-shaped form and consisting substantially of fibrous-material-reinforced synthetic plastic material and friction linings affixed to the carrier. The friction linings are composed of a synthetic plastic material substantially devoid of reinforcing materials and projecting beyond the carrier on both axial sides by a distance corresponding to a predetermined abrasion volume. The carrier of the friction ring is coupled to one of the damper parts.

21 Claims, 8 Drawing Sheets

5,526,714

TORSIONAL VIBRATION DAMPER FOR THE DRIVE LINE OF A MOTOR VEHICLE

BACKGROUND OF THE INVENTION

1. Field of the Invention

The invention relates to a torsional vibration damper for the drive line of a motor vehicle of the type including an input damper part that is rotatable about an axis of rotation, an output damper part that is rotatable about the axis of rotation in relation to the input damper part over a limited relative angle of rotation, at least one spring device coupling the two damper parts together in a rotationally elastic manner, and at least one friction device effective between the two damper parts and having a friction ring axially clamped between two friction surfaces by axial spring force.

2. The Prior Art

A clutch disk with a torsional vibration damper of the foregoing type is disclosed in German Patent No. 23 23 872. As there disclosed, a first friction device is arranged axially between a side flange and the disk forming the input damper part of the torsional vibration damper and includes friction rings made of frictional or bearing materials. A second friction device, which is coupled with a side flange so as to have play in rotation, includes a supplementary friction ring, on both axial sides of which are arranged linings made of frictional or sliding material. Friction rings consisting entirely of frictional material are prepared from reinforced synthetic plastic, for example, in such a way that a synthetic plastic, especially polyamide to which glass fiber particles are admixed, is injection-molded to form ring disks. Such friction rings are, per se, stable and storable, but have the drawback that during operation the glass fiber particles may reach the frictional surfaces. The consequence of this is an increased material wear of the opposite friction surfaces and an uncontrollable increase of the force of friction. If the friction ring is prepared from polyamide devoid of reinforcing materials, then a constant frictional behavior of the friction ring can be achieved over its entire service life. In that case, however, the friction ring has an insufficient structural strength.

SUMMARY OF THE INVENTION

The object of the present invention is to provide a friction ring which combines the advantages of the known materials used for the preparation of friction rings, and which, in particular, has constant frictional properties over its service life and is mechanically stable.

To solve this task, it is proposed, in accordance with the invention, that the friction ring be constructed as a composite ring having a carrier of substantially annular disk-shaped form and a friction lining arrangement fixed to the carrier, with the friction lining arrangement being composed of a synthetic plastic material substantially devoid of reinforcing materials, particularly of fibrous reinforcing materials, and projecting beyond the carrier on axially both sides by a distance corresponding to a predetermined abrasion volume.

Normally, the abrasion volume of the friction lining arrangement will substantially correspond to the expected service life of the friction ring. Since the friction lining arrangement projects on axially both sides beyond the carrier by an abrasion distance corresponding to the abrasion volume, it can be assured that the carrier will not come in contact with one of the opposite friction surfaces. For this reason, in choosing the carrier material, it is possible to use a material of particularly high structural strength, which, together with the construction of the carrier in annular disk form, has a favorable effect on the frictional behavior of the friction ring.

To obtain good coefficients of friction, it is proposed that the principal component of the friction lining arrangement be polyamide.

An admixture of approximately 18% by volume of polytetrafluoroethylene or a copolymer of tetrafluoroethylene and hexafluoropropylene, commercially known as Teflon polymers, leads to particularly good coefficients of friction. When the friction lining arrangement is prepared by an injection-molding process, an admixture of 2% by volume of silicon is proposed to simplify the process.

Preferably, the carrier is comprised substantially of synthetic plastic material, especially polyamide which is reinforced with fibrous material.

The use of a reinforced plastic material for the carrier and an unreinforced plastic material for the friction lining arrangement has the advantage of affording great freedom of design in choosing the materials and in determining the form of the carrier. Furthermore the total weight of the friction ring can be optimized. It is advantageous if the carrier consists of polyamide with an admixture of approximately 30% by volume of glass fiber and/or carbon fiber material. In this way, it is possible to obtain a desired structural strength of the carrier, while assuring that the fiber material will not have an adverse effect on the frictional processes.

According to a preferred embodiment of the friction ring, it is provided that the friction lining arrangement has friction linings on both axial lateral surfaces of the carrier. In such case, the friction linings may be constructed as closed annular friction linings. The possibility is also provided, however, that each of the two friction linings may comprise a plurality of friction lining segments arranged next to one another in the circumferential direction. In this way, a uniform abrasion of the friction linings and a constant coefficient of friction are specifically attained.

In order that the friction linings will be held on the carrier even in the presence of relatively high forces of friction, it is further proposed that the friction linings engage in recesses, and preferably in equicontoured recesses, in the lateral surfaces of the carrier. In this way, the position of the friction linings can be fixed, which contributes to improving the structural strength of the friction lining material and to preserving the original shape of the friction linings over their entire service life.

With a view to the positional stabilization of the friction linings relative to the carrier, it is desirable if the carrier is formed, between the friction linings, with a plurality of axially-extending openings distributed in the circumferential direction, through which openings the friction linings are connected with each other.

If desired, the friction linings may be integrally connected with one another. In that case, the friction linings can be sprayed on, which simplifies the fabrication of the friction ring. As an alternative, the friction linings may be formed separately but connected together, e.g., by snap-type tenon-and-mortise connections. In both cases, it is possible to dispense with additional fastening of the friction linings to the carrier, such as by gluing.

In another preferred embodiment the carrier comprises a plurality of axially-extending openings distributed in the circumferential direction, and the friction lining arrangement extends through the openings and projects axially on both sides of the carrier beyond the lateral surfaces of the carrier by a distance corresponding to the abrasion volume.

The preparation and mounting of the friction ring can be further simplified if the friction lining arrangement has pins extending through the openings. The axially outermost surfaces of the pins are, at least on one axial side of the carrier, substantially within the contour of the opening and form a friction surface.

When the pins fill the openings substantially completely, forces acting radially on the pins are well absorbed by the carrier, so that no additional protective measures are required.

A substantially simplified mounting of the friction lining arrangement on the carrier and a better axial fixation of the pins can be achieved if each pin on one axial side of the carrier projects from a friction lining plate. In that case, it is preferable that the friction lining plate be common to several, and preferably to all, of the pins, whereby the mounting effort is considerably reduced.

For purposes of radial stabilization and increasing structural strength, each friction lining plate preferably engages in an equicontoured recess in the lateral surface of the carrier. In that case, it is particularly favorable if an axially projecting shoulder is radially adjacent to the recess on both sides thereof, on which shoulder the friction lining arrangement is supported.

According to another preferred embodiment of the friction ring, the friction lining arrangement is constructed as friction lining rings which project axially on both sides beyond the annular carrier by a distance corresponding to the abrasion volume and the carrier or the friction lining ring coaxially surrounds the respective other ring component and is connected therewith in a torsion-resistant manner. The torsion-resistant connection of the two ring components can be achieved by connecting the friction lining ring or the carrier via tabs with the other ring component. Expediently, the carrier surrounds the friction lining ring radially on the outside.

For further improvement of the structural strength of the friction lining arrangement, the friction lining arrangement may be welded to the carrier. In this way, the materials of the friction lining arrangement and the carrier are connected over a large surface area. The welding process can be carried out, e.g., by ultrasound welding.

For controlling the friction ring, the carrier projects radially beyond the friction lining arrangement and has, in this region, at least one recess for coupling with a structural component arranged on the input damper part or output damper part. According to a preferred embodiment, the recess is situated on the radially outward side of the carrier. In the region of the contacting surfaces of the carrier with the coupling structural component, the carrier consists substantially of reinforced synthetic plastic material, for which reason the forces introduced thereat can be transmitted safely and without material abrasion.

With a view to a preferred field of application of the torsional vibration damper, it is proposed that it form a single structural unit with a two-mass flywheel which comprises a first flywheel, which is concentric with respect to the axis of rotation and is to be connected with a crankshaft of an internal-combustion engine, and a second flywheel arranged coaxially rotatable with respect to the first flywheel by means of a bearing, the second flywheel being rotationally elastically coupled with the first flywheel through the torsional vibration damper, and that the friction ring be arranged axially between the first and second flywheels. In the case of such two-mass flywheels, the structural strength of the friction ring is of great importance. Also important is that the frictional force of the friction ring be substantially constant over the entire service life of the ring.

In a preferred embodiment of the two-mass flywheel, the first flywheel forms the input damper part, and, together with a hub, can be fixed to the crankshaft in an substantially disk-shaped region; the bearing rests on the hub at an axial distance from the disk-shaped region of the first flywheel; the friction ring together with an axially acting spring, preferably a cup spring, and optionally with an intermediate ring arranged between the friction ring and the spring, surrounds the hub and is arranged in an annular space axially delimited by the disk-shaped region of the first flywheel and a boss of the hub; and the carrier projects radially outwardly beyond the friction lining arrangement and is connected in this region in a torsion-resistant manner with a structural component held on the second flywheel.

In another embodiment of the invention, a disk-shaped structural component of the torsional vibration damper is radially fixed outside the bearing, preferably in the vicinity of the bearing, to the second flywheel by means of a plurality of rivets distributed in the circumferential direction, the heads of the rivets situated towards the first flywheel extending to a point near the disk-shaped region of the first flywheel; the friction ring, spring and optionally the intermediate ring are arranged in the annular space radially delimited by the hub and the placement zone of the rivets; and the carrier of the friction ring extends radially outwardly into the placement zone of the rivets and is provided there with recesses in which the heads of the rivets engage. With regard to production costs of the friction ring this arrangement is very simple. The recesses in the carrier can have an aperture width substantially corresponding to the diameter of the rivet heads. It is also conceivable, however, that the rivet heads engage in the recesses with a play in rotation in order to achieve a delayed friction effect.

To be able to better utilize the structural space within the torsional vibration damper, it is further proposed that the friction ring be adjacent to the disk-shaped region of the first flywheel.

In a further preferred embodiment, the disk-shaped structural component of the torsional vibration damper is arranged axially between the bearing and the disk-shaped region of the first flywheel, and radially overlaps the bearing to axially fix it in position.

In this way, a particularly simple and compact construction of the two-mass flywheel is obtained.

To reduce the contact pressure between the two components in the region of the contact surfaces of the carrier with the rivet heads, it is further proposed that in the region of the recesses the carrier have thickened portions axially projecting beyond the disk-shaped region of the first flywheel, the material thickness of such thickened portions being greater than the material thickness in the region of the friction linings.

BRIEF DESCRIPTION OF THE DRAWINGS

The invention will now be explained in detail by reference to the following detailed description of representative embodiments thereof, taken in conjunction with the accompanying drawings, in which.

DETAILED DESCRIPTION OF REPRESENTATIVE EMBODIMENTS

Figure 1:
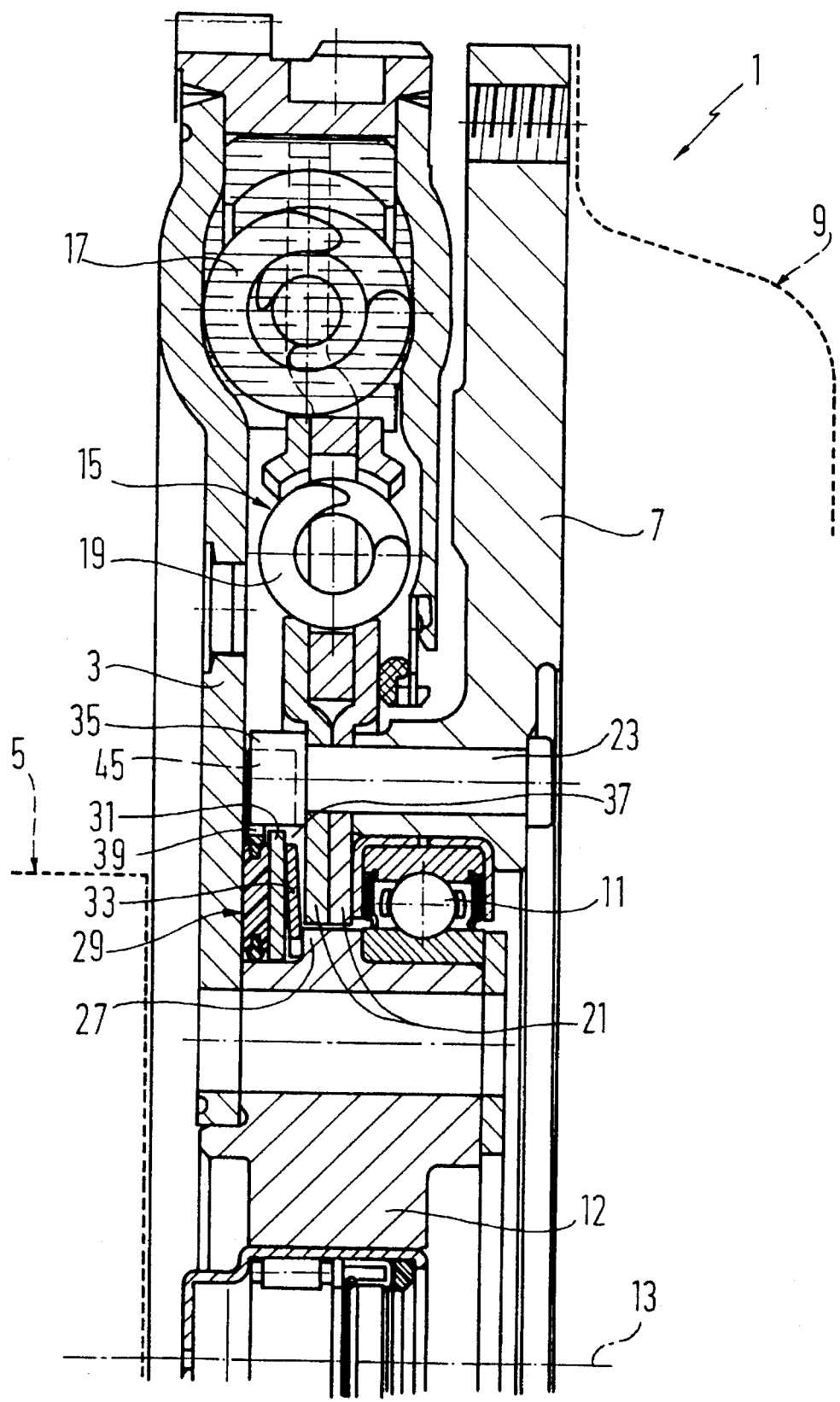
FIG. 1 is a vertical sectional view of the upper half of a two-mass flywheel.

FIG. 1 shows a possible use of the friction ring according to the invention in the torsional vibration damper of a two-mass flywheel 1. The two-mass flywheel 1 includes a first flywheel 3 which can be fixed to the crankshaft 5 (shown in dashed lines) of an internal-combustion engine, and a second flywheel 7, which carries a starting coupling and clutch indicated (in dashed lines) at 9. By means of a bearing 11 the second flywheel 7 is rotatably carried by a hub 12 for rotation about an axis of rotation 13 common to the crankshaft 5. The hub 12 is connected to the first flywheel 3, so that during operation both flywheels 3, 7 and the crankshaft 5 rotate about the axis of rotation 13. Arranged in the torque transmission path between the two flywheels 3, 7 is a torsional vibration damper 15 which couples the flywheels 3, 7 together in a rotationally elastic manner. Upon the introduction of a torque to the two-mass flywheel 1, the torsional vibration damper 15 permits a limited relative rotation of the two flywheels 3, 7 with respect to one another. The torsional vibration damper 15 includes two spring devices 17, 19 arranged in series, which devices 17, 19 are firmly connected through two disk-shaped structural components 21 to the second flywheel 7 by means of a plurality of circumferentially distributed rivets 23. The rivets 23 are arranged at a somewhat greater radial distance from the axis of rotation 13 than is the bearing 11. The first flywheel 3, together with the hub 12, is fixed to the crankshaft 5 in any suitable manner, e.g., by means of screw connections.

The hub 12 has a radially outwardly extending boss 27, which, on its side remote from the first flywheel 3, serves as an axial stop for the inner ring of the bearing 11 arranged on the hub 12. In the axial region delimited by the first flywheel 3 and the boss 27, the hub 12 is surrounded by a friction ring 29, an intermediate ring 31 and a cup spring 33 in axial recognition. At its inner periphery, the cup spring 33 is supported on the side of the boss 27 facing the first flywheel 3 and axially elastically biases the friction ring 29 towards the first flywheel 3. The rivets 23 have heads 35 which extend to near the first flywheel 3, the placement zone of the heads 35 constituting the radially outer limit of an annular space 37 which is delimited radially inwardly by the hub 12 and axially by the first flywheel and the boss 27. The friction ring 29 frictionally contacts the adjacent axial side of the first flywheel 3 (the side remote from the internal-combustion engine), on the one hand, and the adjacent axial side of the intermediate ring 31, on the other hand. In accordance with the invention, these frictional contacts are preferably metal-to-plastic contacts, i.e. the friction ring comprises substantially plastic components, whereas the first flywheel 3 and the intermediate ring 31 are made of metal. The friction ring 29 is prolonged radially outwardly into the placement zone of the heads 35 of the rivets 23, and has recesses 39 in this region wherein are engaged by the heads 35 (see FIG. 2).

The mode of operation of the two-mass flywheel 1 will now be briefly described. Upon introduction of a torque to the two-mass flywheel 1, the second flywheel 7 rotates with respect to the first flywheel 3 in accordance with the magnitude of the torque and the spring rate of the spring devices 17, 19 of the torsional vibration damper 15. In addition to this rotation, relative movement of the two flywheels 3, 7 with respect to one another occurs due to the nonuniformity of the internal combustion engine. In accordance with the invention, the friction ring 29 is so designed that when it exceeds a certain angle of rotation or play in rotation it is controlled by the heads 35 of the rivets 23, i.e., it is entrained, whereby a relative movement is brought about between the friction ring 29 and the first flywheel 3 or the friction ring and the intermediate ring 31. It is assumed that the intermediate ring 31 is in synchronism with the input part either through mechanical stop motion devices or through a targeted formation of the forces of friction.

Figure 2:
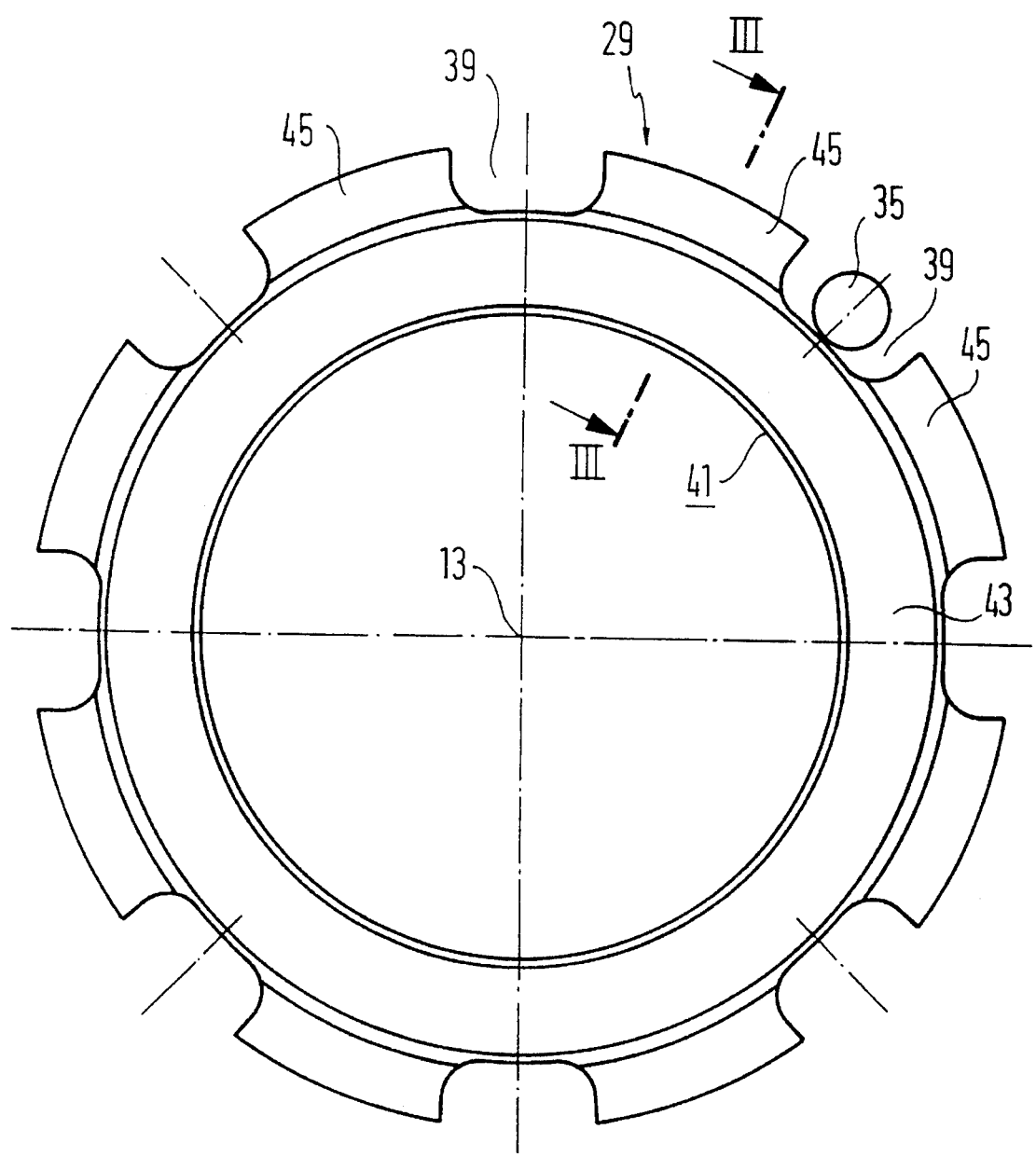
FIG. 2 is a top view of one embodiment of the friction ring.
Figure 3:
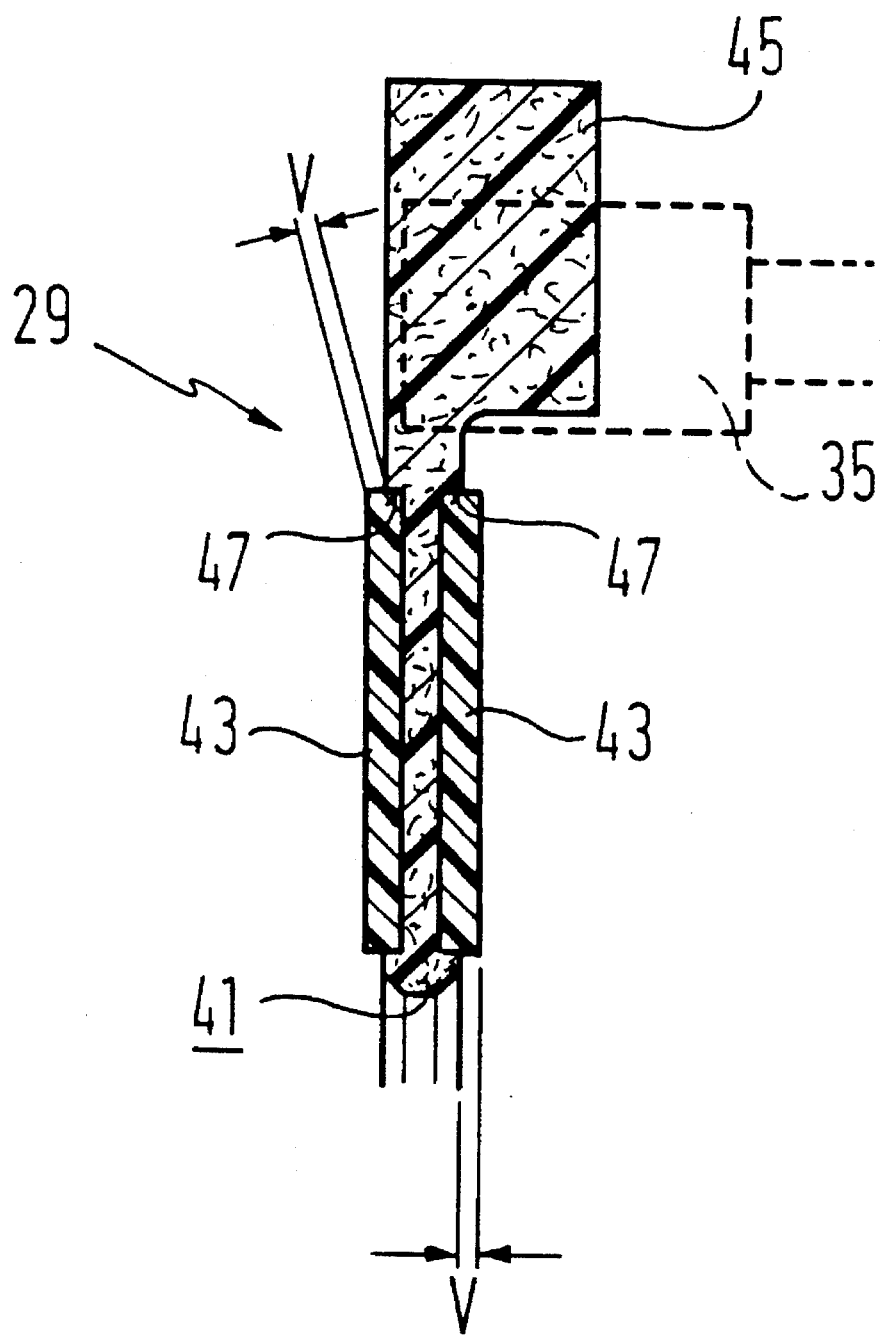
FIG. 3 is a section taken along the line III—III of FIG. 2.

FIGS. 2 and 3 show a first embodiment of the friction ring 29 constructed as a composite ring in accordance with the invention. The friction ring 29 includes an annular disk-shaped carrier 41 produced from fiber-reinforced plastic. The basic material is preferably a polyamide containing an admixture of approximately 30% by volume of glass fibers or carbon fibers. Such a material has a particularly high structural strength. On both axial sides of the carrier 41 are disposed closed annular friction linings 43. At least in the region of the friction linings 43 the carrier 41 is designed in disk-shaped form. Radially outside the region of the friction linings 43, the carrier 41 has circumferentially distributed tabs 45 which are circumferentially adjacent to the recesses 39. Engaging in the recesses with circumferential play are the heads 35 of the rivets 23, only one of which is shown.

FIG. 3 shows a section taken along the line III—III of FIG. 2. Here it can be seen that the tabs 45 are made thicker in the axial direction than is the disk-shaped region of the carrier 41. The purpose of this is to reduce to an acceptable level the contact pressure of the heads 35 resting against the tabs after exceeding the predetermined play in rotation. In its substantially disk-shaped region, the carrier 41 has on both axial sides recesses 47 of the same contour as the friction linings. The recesses are so designed that when the friction linings 43 are in position in the recesses, the linings project axially beyond the carrier 41 by an abrasion distance V. As a rule the abrasion distance V will substantially correspond to the wear of the friction linings 43 occurring during the expected service life of the friction ring 29. The friction linings 43 may be glued into the recesses 47, but they may also be welded in these regions.

Further embodiments of the friction ring according to the invention are described below, with identical structural components being assigned the same reference numerals. Different designs of individual components are characterized by the addition of a letter. Unless otherwise indicated, all such like components function as described above.

Figure 4:
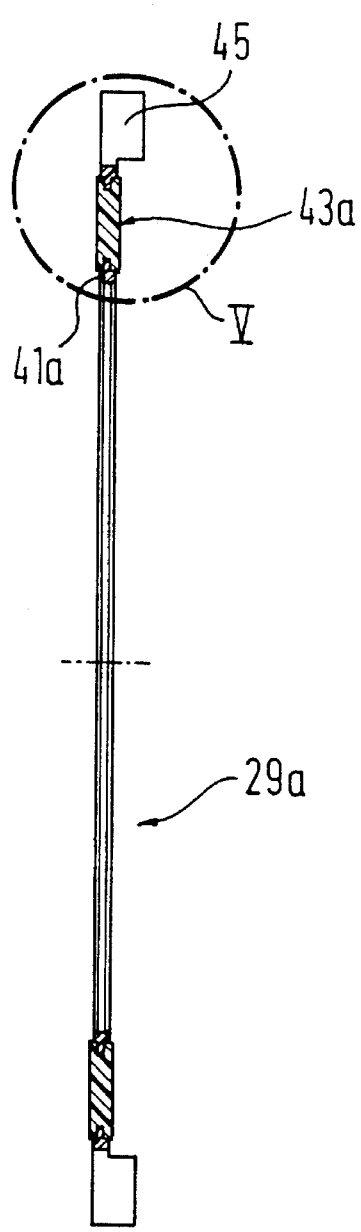
FIG. 4 is a section through another embodiment of the friction ring.
Figure 5:
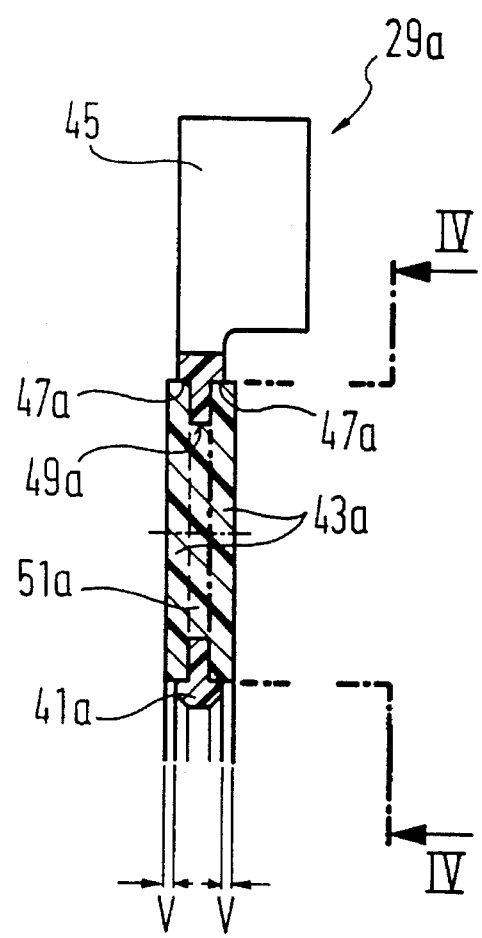
FIG. 5 shows an enlarged detail view of the circled area of FIG. 4.
Figure 4A:
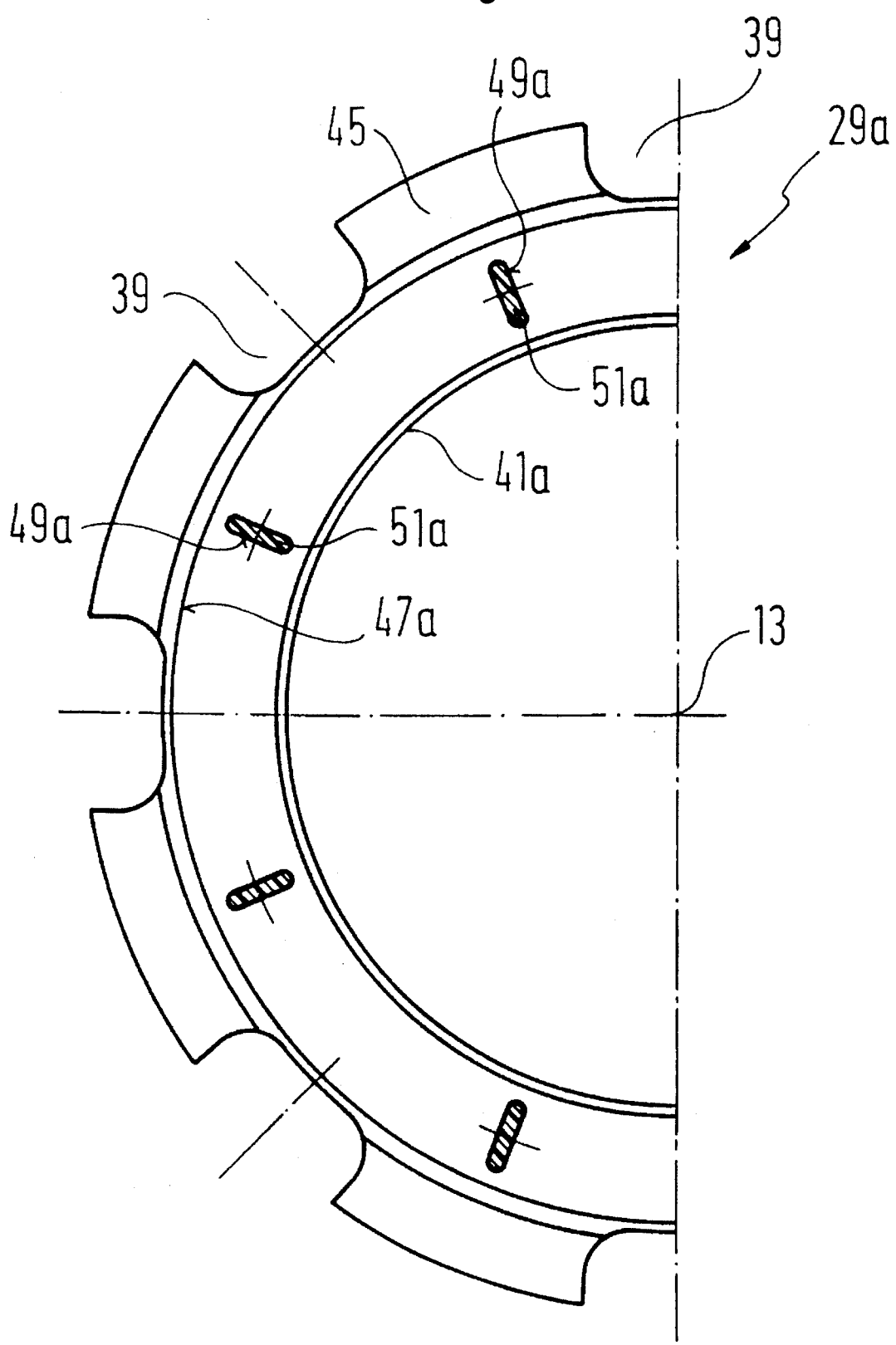
FIG. 4a is a partial top view taken along the line IV—IV of FIG. 5.

FIG. 4 shows in sectional representation another embodiment of a friction ring 29a, and FIG. 5 shows an enlarged detail of FIG. 4. The friction ring 29a carries the friction linings 43a on both axial sides of the support 41a. Radially outside the friction linings 43a, the ring 29a has tabs 45, which, as described in FIG. 2, cooperate with the rivet heads. As can be seen in FIGS. 4a and 5, the carrier 41a has recesses 47a, in whose region circumferentially distributed openings 49a are provided. These openings 49a constitute an axial connection between the recesses 47a on both sides of the carrier 41a, through which the friction linings 43a can be connected with one another. This offers the possibility of anchoring the friction linings with respect to the carrier. In this embodiment, the friction linings 43a are preferably sprayed on the carrier 41a. Formed as a result are bridges 51a that are homogeneous with the friction linings 43a and that extend through the openings 49a so as to integrally connect the two friction linings 43a on opposite sides of the carrier. Thus the friction linings 43a are radially fixed with respect to the carrier 41a, which is of importance because, in this embodiment, the friction linings 43a consist substantially of unreinforced plastic, which, on the one hand, makes it possible to achieve an excellent constancy of the frictional effect, but, on the other hand, the structural strength of the friction linings per se would otherwise not always be sufficient.

Figure 6:
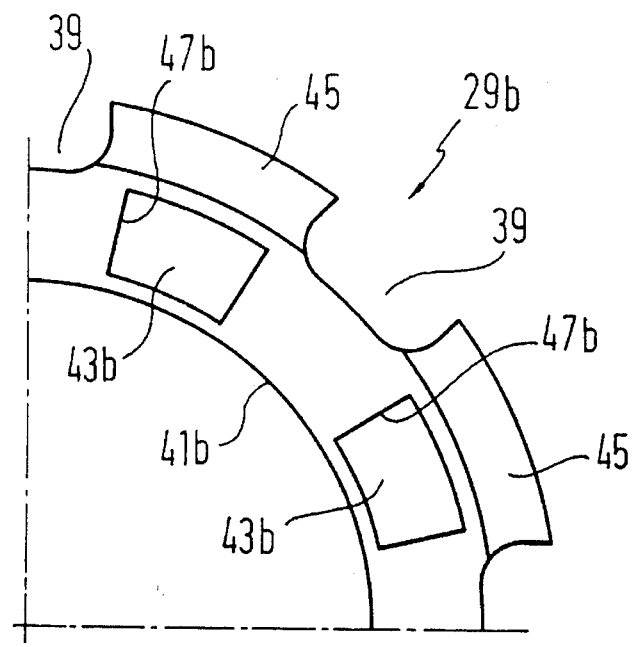
FIG. 6 is a partial top view of another embodiment of the friction ring.

FIG. 6 shows another embodiment of a friction ring 29b according to the invention, wherein the friction lining arrangement is constructed in the form of friction lining elements 43b arranged next to each other in the circumferential direction. The friction lining elements 43b may, in accordance with FIGS. 2 and 3, be placed in equicontoured recesses 47b of the carrier 41b. Also possible is a connection of axially opposite friction lining elements via bridges, as shown in FIGS. 4, 4a and 5. In general, however, there is also the possibility of dispensing with recesses on the carrier, so that in the case of FIGS. 2 to 5 the friction lining rings 43, 43a and in case of FIG. 6 the friction lining elements 43b could be fixed to the carrier by, for example, gluing or welding.

Figure 7:
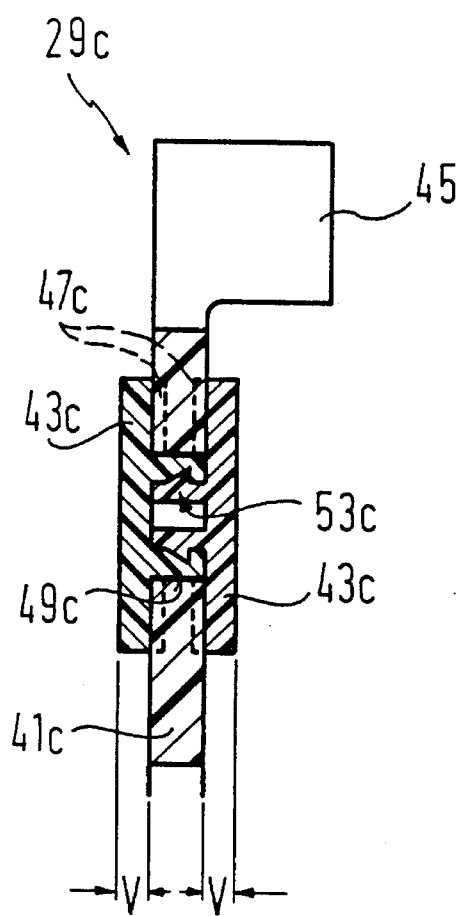
FIG. 7 is a partial section taken through another embodiment of the friction ring.

Shown in FIG. 7 is another embodiment of a friction ring according to the invention. The friction ring 29c includes a carrier 41c, on which friction linings 43c are arranged on both axial sides. The two friction linings 43c are connected with one another via snap-type tenon-and-mortise connections 53c. To this end openings 49c are again provided in the carrier. In the region radially outside the openings 49c, the friction linings 43c may if desired engage in recesses 47c of the carrier 41c, as shown by the dashed lines in FIG. 7. However, this is not necessary.

Figure 8:
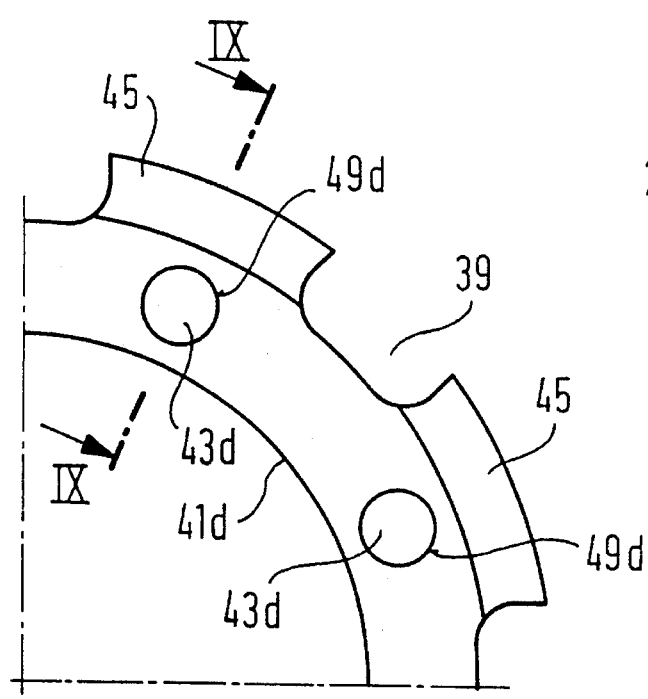
FIG. 8 is a partial top view of another embodiment of the friction ring.
Figure 9:
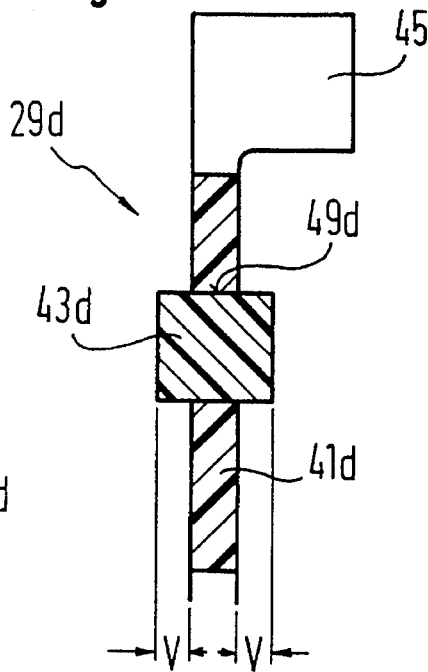
FIG. 9 is a section taken along the line IX—IX of FIG. 8.
Figure 10:
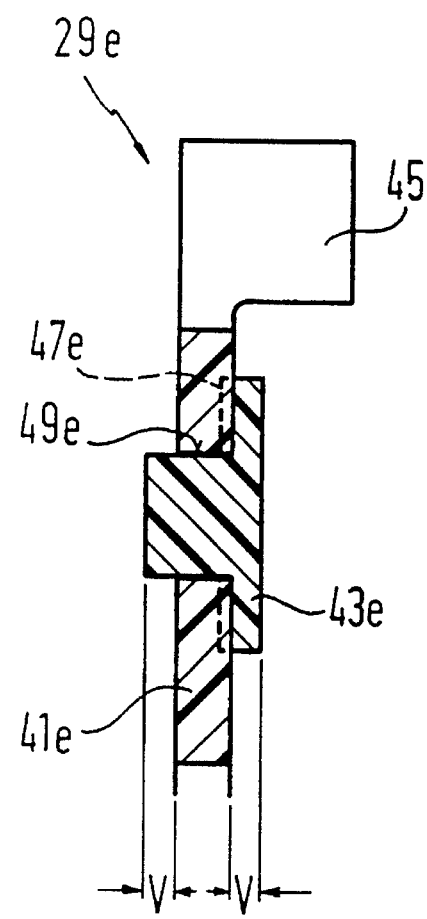
FIG. 10 is a section of a variant of the embodiment according to FIG. 9.

FIGS. 8 and 9 show another possible embodiment of a friction ring according to the invention. Here, FIG. 9 represents a section taken along the line IX—IX of FIG. 8. In this embodiment, the friction lining arrangement is formed by friction pins 43d which pass through openings 49d of the carrier 41d. Preferably, the cross-sectional configuration of the friction pins 43d is substantially the same as the cross-sectional configuration of the openings 49d. The friction pins 43d can be force fitted in the openings 49d, but they can also be glued or welded in. Alternatively it may be provided, as shown in FIG. 10, that the friction pins axially project from a friction lining plate 43e. The simplest solution will consist in associating all pins with a single friction lining plate 43a. In this embodiment, too, the friction lining plate 43e can engage in a recess 47e of the carrier 41e if desired.

Figure 11:
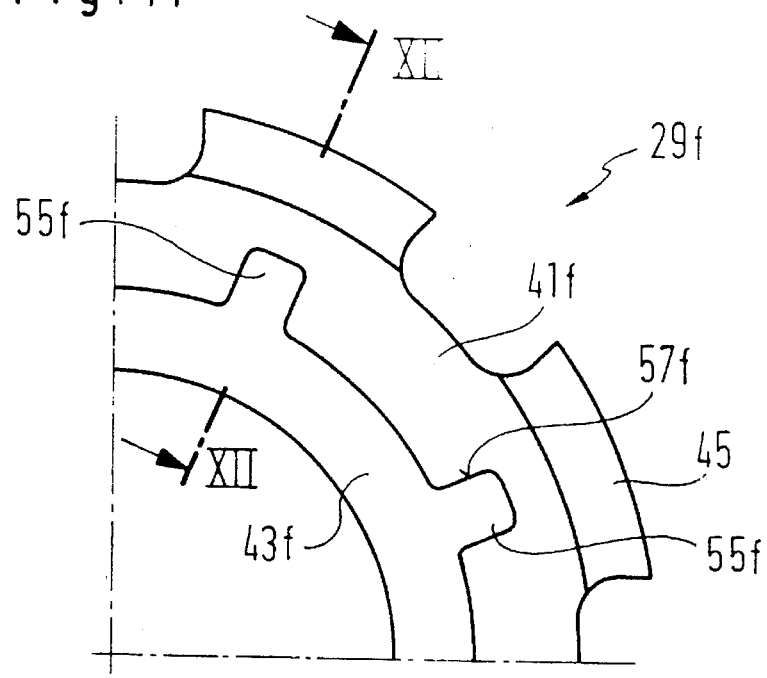
FIG. 11 is a vertical top view of another embodiment of the friction ring.
Figure 12:
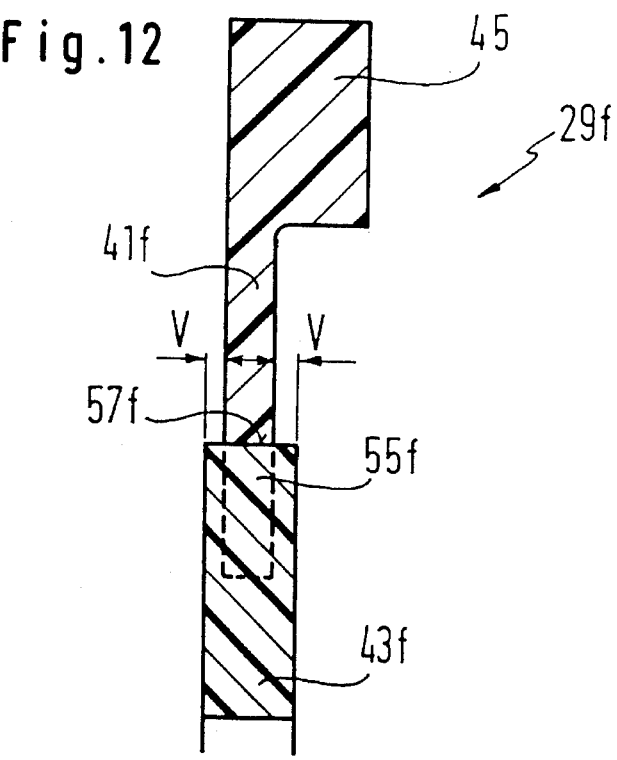
FIG. 12 is a section taken along the line XII—XII of FIG. 11.

FIGS. 11 and 12 show an embodiment of a friction ring 29f according to the invention, in which a friction lining ring 43f is arranged radially within a carrier 41f. The two ring components are coupled through tabs 55f formed on the friction lining ring 43f, which tabs engage in recesses 57f provided on the inner periphery of the carrier 41f. In this case, too, the friction lining ring 43f is so designed that it projects on both axial sides beyond the disk-shaped region of the carrier by a distance V corresponding to the extent of abrasion.

The invention claimed is:

1. A torsional vibration damper for the drive line of a motor vehicle comprising an input damper part rotatable about an axis of rotation, an output damper part rotatable about the axis of rotation relative to the input damper part over a limited relative angle of rotation, at least one spring means for coupling the two damper parts together in a rotationally elastic manner, at least one friction device operatively coupled between the two damper parts and having a friction ring axially clamped between two friction surfaces by axial spring force, said friction ring being constructed as a composite ring having a carrier of substantially annular disk-shaped form and consisting substantially of fibrous-material-reinforced synthetic plastic material and friction linings fixed to the carrier, the friction linings being composed of a synthetic plastic material substantially devoid of reinforcing materials and projecting beyond the carrier on both axial sides by a distance corresponding to a predetermined abrasion volume, and engagement means for coupling the carrier to one of said input damper part and said output damper part.

2. The torsional vibration damper of claim 1, wherein the friction linings are composed of an admixture of approximately 18% by volume of at least one polymer selected from the group consisting of polytetrafluoroethylene, tetrafluoroethylene and hexafluoropropylene, and mixtures thereof.

3. The torsional vibration damper of claim 2, wherein the admixture further includes approximately 2% by volume of silicon.

4. The torsional vibration damper of claim 1, wherein the carrier (41) consists substantially of polyamide with an admixture of approximately 30% by volume of at least one of glass fiber and carbon fiber material.

5. The torsional vibration damper of claim 1, wherein there is at least one of said friction linings on each of the axial sides of the carrier, and the carrier has between the friction linings a plurality of axially extending openings distributed in the circumferential direction through which the friction linings are connected with one another.

6. The torsional vibration damper of claim 5, wherein each of said friction linings is constructed as a closed annular friction lining.

7. The torsional vibration damper of claim 5, wherein each of said friction linings comprises a plurality of friction lining segments arranged next to one another in the circumferential direction.

8. The torsional vibration damper of claim 5, wherein each of said friction linings engages a corresponding recess in one of the axial sides of the carrier.

9. The torsional vibration damper of claim 5, wherein the friction linings are integrally connected with one another through the plurality of axially extending openings.

10. The torsional vibration damper of claim 5, wherein the friction linings are connected with one another through the plurality of axially extending openings by snap-type tenon-and-mortise connections.

11. The torsional vibration damper of claim 1, wherein the carrier has a plurality of axially extending openings distributed in the circumferential direction, and the friction linings extend through the plurality of axially extending openings and project axially on both of said axial sides of the carrier beyond the carrier by a distance corresponding to the abrasion volume.

12. The torsional vibration damper of claim 11, wherein the friction linings include pins extending through the plurality of axially extending openings, the axial outermost surfaces of the pins at least on one of said axial sides of the carrier lying substantially within the cross-sectional area of the plurality of axially extending openings and forming friction surfaces.

13. The torsional vibration damper of claim 12, wherein each of said pins on one of said axial sides of the carrier projects from a friction lining plate.

14. The torsional vibration damper of claim 13, wherein the friction lining plate is common to the pins.

15. The torsional vibration damper of claim 13, wherein the friction lining plate engages in an equicontoured recess in one of the axial sides of the carrier.

16. The torsional vibration damper of claim 1, wherein the friction linings comprise a friction lining ring projecting beyond the carrier on both of said axial sides thereof by a distance corresponding to the abrasion volume, and one of the carrier and the friction lining ring coaxially surrounds the other and is connected therewith in a torsion-resistant manner.

17. The torsional vibration damper of claim 16, wherein the friction lining ring and the carrier are connected with one another in a torsion-resistant manner through tabs on one of the carrier and the friction lining ring.

18. The torsional vibration damper of claim 16, wherein a bearing externally surrounds the friction lining ring.

19. The torsional vibration damper of claim 1, wherein the friction linings are welded to the carrier.

20. The torsional vibration damper of claim 1, wherein the carrier projects radially beyond the friction linings and, in the region of said radial projection, is formed with at least one recess for coupling with a structural component arranged on one of the input damper part and the output damper part, and wherein the carrier is thicker in the region of the radial projection than in the remainder of the carrier.

21. The torsional vibration damper of claim 1, wherein the input damper part includes a first flywheel concentric with respect to the axis of rotation, said first flywheel being adapted to be connected with a crankshaft of an internal combustion engine, the output damper part includes a second flywheel arranged coaxially and rotatably with respect to the first flywheel by means of a bearing, the friction ring is arranged axially between the first and second flywheels, a disk-shaped structural component is radially fixed in the vicinity of the bearing to the second flywheel by said engagement means, said engagement means including a plurality of rivets distributed in the circumferential direction, the heads of said plurality of rivets are situated towards the first flywheel and extend to a point near a disk-shaped region of the first flywheel, the carrier extends radially outwardly into a zone containing the plurality of rivets and is there provided with recesses in which the heads of the plurality of rivets engage, and the carrier is thicker in the region of the recesses than in the remainder of the carrier.

* * * * *

UNITED STATES PATENT AND TRADEMARK OFFICE
CERTIFICATE OF CORRECTION

PATENT NO. : 5,526,714
DATED : June 18, 1996
INVENTOR(S) : Bernhard Schierling

It is certified that error appears in the above-indentified patent and that said Letters Patent is hereby corrected as shown below:

Col. 1, Item [56] References Cited, U.S. Patent Documents, the following should be included:
    --4,782,933  11/1988  Jäckel et al.
      4,847,135  7/1989   Braus et al.--;
Col. 1, Item [56] References Cited, Foreign Patent Documents, the following should be included:
    --8604237   10/1986  France
      8612709   3/1987   France
      0234602   9/1987   Europe--
Col. 2, line 10, "Teflon" should read --TEFLON--;
Col. 8, line 39, delete "(41)".

Signed and Sealed this

Seventh Day of January, 1997

Attest:

BRUCE LEHMAN

*Attesting Officer*    *Commissioner of Patents and Trademarks*